Aug. 31, 1926.
F. WERMES
WRENCH HANDLE
Filed Oct. 4, 1923
1,597,747
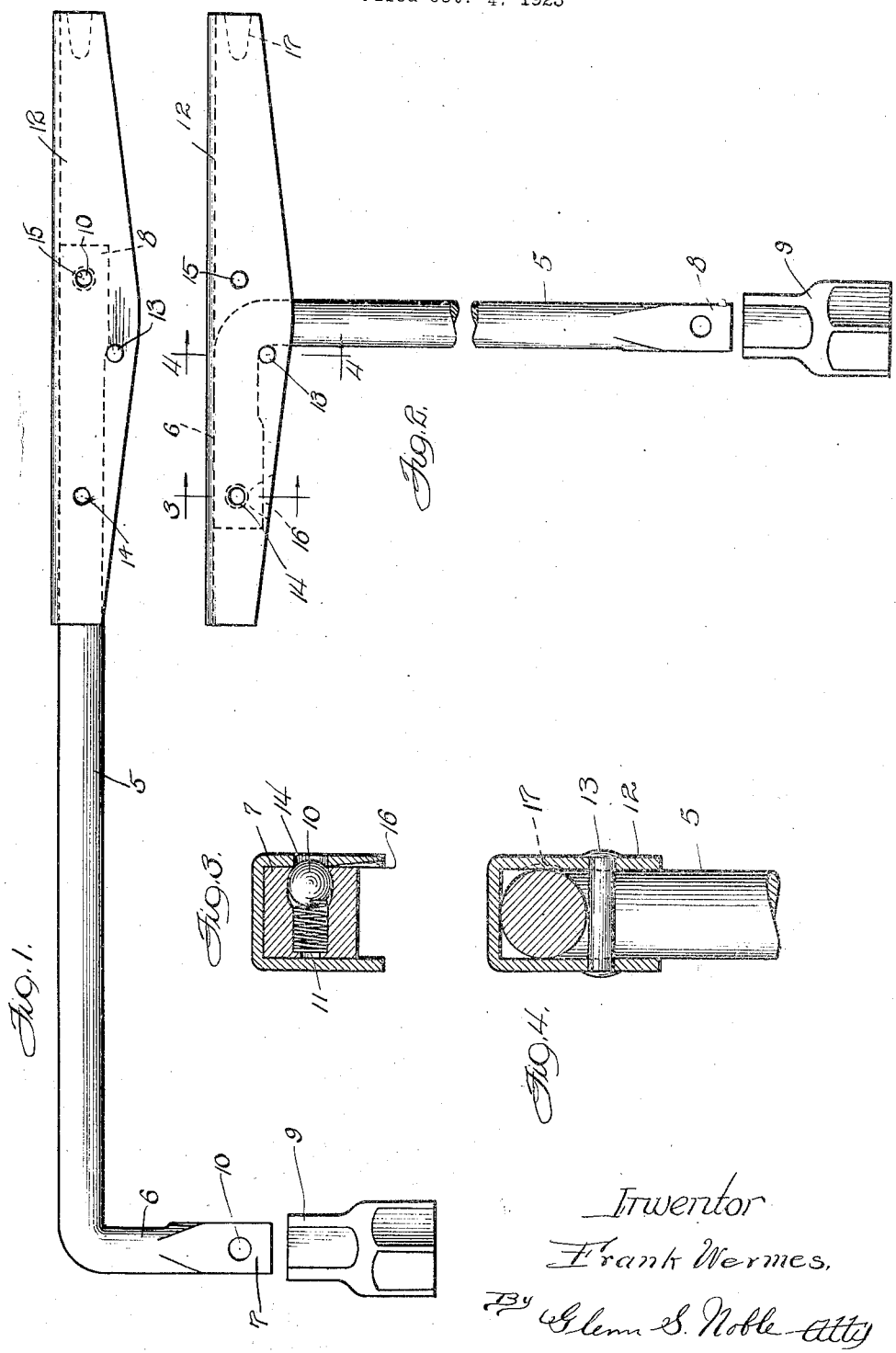
Inventor
Frank Wermes,
By Glenn S. Noble Atty Patented Aug. 31, 1926.

1,597,747

UNITED STATES PATENT OFFICE.

FRANK WERMES, OF AURORA, ILLINOIS.

WRENCH HANDLE.

Application filed October 4, 1923. Serial No. 666,502.

This invention relates to wrenches adapted for more or less general purposes and is particularly directed to socket wrenches having removable or interchangeable sockets whereby sockets of different sizes may be used with the same handle. In wrench sets of this kind it is often necessary or desirable to furnish T handles or off-set handles or both. However, an ordinary T handle occupies a considerable amount of space and it is not adapted for convenient packing. The present invention provides a folding T handle or a combined T handle and L or off-set handle.

The objects of the present invention are to provide a wrench having a folding handle portion; to provide a wrench having a shank provided with a folding and slidable handle portion or grip member; to provide a wrench having a combined T handle and L handle which may be folded to occupy but little space; and, in general, to provide such improved wrench as will be described more fully hereinafter.

In the accompanying drawings illustrating this invention;

Fig. 1 is a side view showing the handle or grip portion in alignment with the shank to form an L wrench;

Fig. 2 is a side view showing the handle arranged at right angles to the shank to form a T wrench;

Fig. 3 is an enlarged sectional view taken on the line 3—3 of Fig. 2; and

Fig. 4 is an enlarged sectional view taken on the line 4—4 of Fig. 2.

In the particular form of the invention as shown in these drawings, the bar or shank 5 is provided at one end with a bent or off-set portion 6 thereby forming what is commonly known as an offset handle. This shank is preferably round and the ends 7 and 8 are squared in order to receive the sockets 9. Each of these ends is preferably provided with a retaining ball 10 which is pressed outwardly by a spring 11 for holding the socket in position, this being a well-known form of construction.

The shank 5 is provided with an adjustable handle or hand piece 12 which is preferably made substantially U-shaped in cross section and fits freely over the same. This handle portion is made in any suitable shape but is preferably tapered on the open side which is provided with a pin or rivet 13 for holding the handle in engagement with the shank. The handle portion 12 is also provided with holes 14 and 15 for receiving the retaining ball 10 in the respective ends 7 and 8 of the shank 5. The inner edges of the sides or flanges of the handle 12 are also preferably beveled as indicated at 16 and 17 for convenience in slipping the handle over the balls or depressing the balls preparatory to moving the handle to adjusted position.

When the device is to be used as an offset wrench, the handle portion 12 is adjusted to the position shown in Fig. 1 in alignment with the rod or shank 5 and not only serves to provide an improved grip but also increases the length or leverage of the handle. It will be noted that the pin 13 will engage with the squared or angular ends of the rod in order to prevent the end portion 12 from being disconnected therefrom.

When the device is to be used as a T handled wrench, the end portion 12 is adjusted to the position shown in Fig. 2 with the retaining ball 10 in engagement with the hole 14 and in making this adjustment the pin 13 serves as a convenient fulcrum for swinging the end portion or grip 12 into locking position.

It will be noted that various forms and sizes of shanks or handles are necessary or desirable for different conditions and therefore I do not wish to be limited to the exact arrangement herein shown and described, except as specified in the following claims, in which I claim:

1. The combination with a wrench handle having a longitudinal portion and an offset in one end, of a grip member adjustably and non-detachably secured to the handle and adapted to engage with and to be adjusted in alignment with the longitudinal portion or to engage with and to be adjusted in alignment with the offset portion of the handle and means for holding the grip member in adjusted position.

2. The combination with a wrench handle comprising a rod having ends formed angular in cross section and provided with spring pressed balls, and having shoulders adjacent to the ends, of a U-shaped grip member fitting over said handle and having a pin which is adapted to engage with said shoulders for holding it in position thereon, said U-shaped member being adapted to form an extension with said handle and being adapted to be held in adjusted position by said spring pressed balls.

3. The combination with a handle of the character set forth comprising a rod having one end bent at an angle with the main portion, the other end of said rod being made angular in cross section, spring pressed retaining balls at either end of said handle, a U-shaped member fitting over the handle, a pin for holding the U-shaped member in engagement with the handle, said U-shaped member having one or more recesses for receiving the spring pressed balls, the arrangement being such that the U-shaped member may be arranged at right angles to the main portion of the handle to form a T wrench or may be arranged in alignment with the handle to form an offset wrench.

4. The combination with a wrench shank comprising a rod having one end bent at an angle thereto, of a handle or grip member fitting over said rod, a pin through said handle, said pin serving as a pivot for swinging the handle to bring it into engagement with the bent portion to form a T handled wrench.

5. The combination with a wrench shank having one end bent to form an offset, the extremeties of said shank being made square in cross section, spring pressed balls on the sides of the shank adjacent to the ends, a grip member of substantially U-shape in cross section fitting over said shank and adapted to engage with the square ends, a pin through the sides of said U-shaped member for holding the member in position on the shank and serving as a pivot for adjusting the U-shaped member, said U-shaped member having one or more recesses for receiving the spring pressed balls and also being beveled on the inner surfaces to depress the balls preparatory to their entering the respective recesses.

6. The combination with a wrench shank of the type set forth, comprising a round bent rod having ends which are rectangular in cross section of a grip member having a slot therein which is adapted to fit over said rectangular ends and which is adjustably and non-detachably secured to the shank whereby the shank may be utilized to form a T handle or an L handle, substantially as described.

FRANK WERMES.